(12) United States Patent
Goren et al.

(10) Patent No.: US 6,547,142 B1
(45) Date of Patent: Apr. 15, 2003

(54) METHOD OF SCANNING INDICIA USING SELECTIVE SAMPLING

(75) Inventors: David Goren, Ronkonkoma, NY (US); Edward Barkan, Miller Place, NY (US); Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/715,646

(22) Filed: Nov. 17, 2000

(65) Prior Publication Data (65)

Related U.S. Application Data

(62) Division of application No. 08/455,216, filed on May 31, 1995, now Pat. No. 6,170,749.

(51) Int. Cl.[7] .................................................. G06K 7/10
(52) U.S. Cl. ........................... 235/462.25; 235/462.01; 235/472.01
(58) Field of Search ................................ 235/462, 472, 235/375, 454, 494

(56) References Cited

U.S. PATENT DOCUMENTS

| 3,796,862 A | 3/1974 | Asija ..................... 235/61.11 E |
| 3,798,458 A | 3/1974 | Buckingham et al. ...... 235/463 |
| 3,892,949 A | 7/1975 | Dodson, III .......... 235/61.11 E |

(List continued on next page.)

FOREIGN PATENT DOCUMENTS

| EP | 0 036 950 | 10/1981 |
| EP | 0 419 226 | 3/1991 |
| EP | 0 653 721 | 5/1995 |

OTHER PUBLICATIONS

Ehrich et al., "Representation of Random Waveforms by Relational Trees," IEEE Transactions on Computers, vol. C–25, No. 7, pp. 725–736 (Jul. 1976).

Eklundh et al., "Peak Detection Using Difference Operators," IEEE Transactions on Pattern Analysis and Machine Intelligence, vol. PAMI–1, No. 3, pp. 317–325 (Jul. 1979).

Horowitz, "A Syntactic Algorithm for Peak Detection in Waveforms with Applications to Cardiography," Communications of the ACM, vol. 18, No. 5 (May 1975).

Kiryati et al., "Gray Levels Can Improve the Performance of Binary Image Digitizers," CVGIP: Graphical Models and Image Processing, vol. 53, No. 1, pp. 31–39 (Jan. 1991).

Pavlidis, "Algorithms for Shape Analysis of Contours and Waveforms," IEEE Transactions on Pattern Analysis and Machine Intelligence, vol. PAMI–2, No. 4, pp. 301–312 (Jul. 1980).

Pavlidis et al., "Fundamentals of Bar Code Information Theory," Computer, pp. 74–86 (Apr. 1990).

Primary Examiner—Thien M. Le
(74) Attorney, Agent, or Firm—Fish & Richardson P.C.

(57) ABSTRACT

A method of reading an indicia, for example a bar code, comprising areas of differing light reflectivity comprises producing an electrical signal representative of light reflected from the indicia and selectively sampling the signal at a rate well below the Nyquist rate. The sample points are not uniform, and are chosen to represent key features in the signal. An attempt is then made to decode the indicia, using the samples. If the decode is unsuccessful, the samples which have been collected are analyzed to provide information on the extent to which they represent true data corresponding to the indicia, and the extent to which they present noise. Signal collection and/or processing and/or sampling is then adjusted and the process is repeated. The continual feed-back of information related to the scanning environment allows more aggressive decoding techniques to be used.

12 Claims, 2 Drawing Sheets

U.S. PATENT DOCUMENTS

| | | | |
|---|---|---|---|
| 3,932,840 A | | 1/1976 | Hanchett .................... 235/463 |
| 4,160,156 A | | 7/1979 | Sherer ........................ 235/463 |
| 4,184,179 A | | 1/1980 | Demig ....................... 235/463 |
| 4,251,798 A | | 2/1981 | Swartz et al. ....... 340/146.3 SY |
| 4,354,101 A | | 10/1982 | Hester et al. ................ 235/463 |
| 4,360,798 A | | 11/1982 | Swartz et al. ...... 340/146.3 AG |
| 4,369,361 A | | 1/1983 | Swartz et al. ............... 235/470 |
| 4,387,297 A | | 6/1983 | Swartz et al. ............... 235/462 |
| 4,409,470 A | | 10/1983 | Shepard et al. ............. 235/472 |
| 4,460,120 A | | 7/1984 | Shepard et al. ............. 235/472 |
| 4,496,831 A | | 1/1985 | Swartz et al. ............... 235/472 |
| 4,500,776 A | | 2/1985 | Laser ......................... 235/162 |
| 4,578,571 A | * | 3/1986 | Williams .................... 235/472 |
| 4,709,195 A | | 11/1987 | Hellekson et al. .......... 318/254 |
| 4,717,818 A | | 1/1988 | Brookman et al. .......... 235/462 |
| 4,728,784 A | * | 3/1988 | Stewart ....................... 235/462 |
| 4,740,675 A | | 4/1988 | Brosnan et al. ............. 235/462 |
| 4,746,789 A | | 5/1988 | Gieles et al. ................ 235/463 |
| 4,749,879 A | | 6/1988 | Peterson et al. ............ 307/354 |
| 4,758,717 A | | 7/1988 | Shepard et al. ............. 235/472 |
| 4,760,248 A | | 7/1988 | Swartz et al. ............... 235/472 |
| 4,782,220 A | | 11/1988 | Shuren ....................... 235/463 |
| 4,798,943 A | | 1/1989 | Cherry ....................... 235/463 |
| 4,808,804 A | | 2/1989 | Krichever et al. .......... 235/462 |
| 4,855,581 A | | 8/1989 | Mertel et al. ................ 235/462 |
| 4,859,840 A | | 8/1989 | Hasegawa et al. .......... 235/463 |
| 4,896,026 A | | 1/1990 | Krichever et al. .......... 235/472 |
| 4,933,538 A | | 6/1990 | Heiman et al. ............. 235/462 |
| 4,973,829 A | | 11/1990 | Ishida et al. ................. 235/462 |
| 4,992,717 A | | 2/1991 | Marwin et al. ............. 318/696 |
| 5,004,916 A | | 4/1991 | Collins, Jr. .................. 250/235 |
| 5,010,242 A | | 4/1991 | Frontino ..................... 235/467 |
| 5,023,818 A | | 6/1991 | Wittensoldner et al. ..................... 364/551.01 |
| 5,029,183 A | | 7/1991 | Tymes ............................ 375/1 |
| 5,036,183 A | | 7/1991 | Ouchi et al. ................ 235/462 |
| 5,059,773 A | | 10/1991 | Shimizu et al. ............. 235/436 |
| 5,068,520 A | | 11/1991 | Sato ........................... 235/462 |
| 5,073,954 A | | 12/1991 | Van Tyne et al. ............. 382/18 |
| 5,128,527 A | | 7/1992 | Kawai et al. ................ 235/462 |
| 5,136,147 A | * | 8/1992 | Metlitsky et al. ............ 235/472 |
| 5,140,146 A | | 8/1992 | Metlitsky et al. ........... 235/462 |
| 5,302,813 A | | 4/1994 | Goren ........................ 235/462 |
| 5,311,001 A | | 5/1994 | Joseph et al. ................ 235/462 |
| 5,336,874 A | | 8/1994 | Hasegawa ................... 235/466 |
| 5,343,027 A | | 8/1994 | Knowles et al. ............. 235/462 |
| 5,449,893 A | * | 9/1995 | Bridgelall et al. ........... 235/462 |
| 5,457,309 A | | 10/1995 | Pelton ........................ 235/462 |
| 5,478,997 A | * | 12/1995 | Bridgelall et al. ........... 235/462 |
| 5,525,788 A | * | 6/1996 | Bridgelall et al. ........... 235/462 |
| 5,591,953 A | | 1/1997 | Rockstein et al. ........... 235/462 |
| 5,608,202 A | * | 3/1997 | Bridgelall et al. ........... 235/462 |
| 5,612,531 A | | 3/1997 | Barkan ....................... 235/462 |
| 5,912,768 A | * | 6/1999 | Sissom et al. .............. 359/629 |
| 5,952,644 A | * | 9/1999 | Barkan ....................... 235/463 |
| 5,988,502 A | * | 11/1999 | Krichever et al. ........... 235/454 |
| 6,000,616 A | * | 12/1999 | Spitz ..................... 235/462.16 |
| 6,082,621 A | * | 7/2000 | Chan et al. ............ 235/462.28 |
| 6,137,105 A | * | 10/2000 | Drobot et al. ............... 250/234 |
| 6,170,749 B1 | * | 1/2001 | Goren et al. ........... 235/462.06 |

* cited by examiner

METHOD OF SCANNING INDICIA USING SELECTIVE SAMPLING

CROSS-REFERENCE TO RELATED APPLICATION

This application is a divisional application of and claims priority to U.S. application Ser. No. 08/455,216, filed on May 31, 1995 now U.S. Pat. No. 6,170,709.

BACKGROUND OF INVENTION

The invention relates to a method of scanning indicia using selective sampling, and particularly although not exclusively to a method of reading bar codes using a laser scanner.

Various optical readers and optical scanning systems have been developed heretofore for reading bar code symbols appearing on a label or on the surface of an article. The bar code symbol itself is a coded pattern of indicia comprising a series of adjacent bars and spaces of various widths, the bars and spaces having different light reflecting characteristics.

A number of different bar code standards or symbologies exist. These symbologies include, for example, UPC/EAN, Code 128, Codabar, and Interleaved 2 of 5. The readers and scanning systems electro-optically decode each symbol to produce multiple alphanumerical characters that are intended to be descriptive of the article or some characteristic thereof. Such characters are typically represented in digital from as an input to a data processing system for applications in point-of-scale processing, inventory control, and the like. Scanning systems of this general type have been disclosed, for example, in U.S. Pat. Nos. 4,251,798; 4,360,798; 4,369,361; 4,387,297; 4,409,470 and 4,460,120, all of which have been assigned to Symbol Technologies, Inc., the assignee of this application. As disclosed in some of the above patents, one commonly used example of such a scanning system functions by scanning the laser beam in a line across a symbol. The symbol, composed of alternating, rectangular, reflective and non-reflective segments of various widths, reflects a portion of this lasex light. A photo detector then detects this reflected light and creates an electrical signal indicative of the intensity of the received light. The electronic circuitry or software of the scanning system decodes the electrical signal creating a digital representation of the data represented by the symbol scanned.

Typically, a scanner includes a light source such as a gas laser or semiconductor laser that generates a light beam. The use of semiconductor lasers as the light source in scanner systems is especially desirable because of their small size, low cost and low power requirements. The light beam is optically modified, typically by a lens, to form a beam spot of a certain size at a prescribed distance. It is preferred that the beam spot size be no larger than approximately the minimum width between regions of different light reflectivities, i.e., the bars and spaces of the symbol.

A scanner also includes a scanning component and a photo detector. The scanning component may either sweep the beam spot across the symbol and trace a scan line across the past the symbol, or scan the field of view of the scanner, or do both. The photodetector has a field of view which extends across and slightly past the symbol and functions to detect light reflected from the symbol. The analog electrical signal from the photodetector is first typically converted into a pulse width modulated digital signal, with the widths corresponding to the physical widths of the bars and spaces. This signal is then decoded according to the specific symbology into a binary representation of the date encoded in the symbol to the alphanumeric characters so represented.

In the prior art described above, a digitizer circuit may be used to translate the analog signal into a digital representation called a Digital Bar Pattern (or DBP). This simple digital representation of the data works extremely well in many situations, although it may sometimes be susceptible to unrecoverable errors if the bar code symbol to be read has substantial noise associated with it. With this prior art representation, a single extra edge detected or shifted due to noise may prevent proper decoding.

One straightforward way to acquire a more accurate representation of the bar code, for example for more aggressive or adaptive decoding, would be to sample the analog signal above the Nyquist rate, store the analog signal in memory, and then apply digital signal processing (DSP) techniques. This solution is, however, very expensive due to the large amount of samples required and the high speed processing that is necessary.

There is accordingly a need to provide a relatively cheap and reliable method of decoding an indicia (for example a bar code Symbol) after the optical detection system has transduced it into a distorted analog waveform. Such a need is particularly acute where it is desired to decode the symbol aggressively, that is by attempting to decode after a single scan.

It is an object of the present invention to aim to meet this need.

It is a further object of the invention to provide an efficient and economical means of acquiring an improved representation of the bar code signal.

SUMMARY OF THE INVENTION

According to the present invention there is provided a method of reading an indicia comprising areas or differing light reflectivity, comprising:
 a) detecting light reflected from the indicia and producing an electrical signal representative thereof;
 b) selectively sampling the signal, to produce a series of samples, at a sequence or points determined by detected features within the signal;
 c) attempting to decode the indicia using at least some of the samples in the series and, if the attempt was unsuccessful:
  i) analyzing the samples to provide information on the extent to which the samples appear to represent data corresponding to the indicia; and
  ii) repeating steps (a) and (b), adapting the producing of the electrical signal or the selective sampling according to the said information.

The method of the present invention allows aggressive and reliable bar code symbol decoding, after the optical detection system in the scanner has transduced it into a distorted analog waveform.

The invention allows in particular an efficient and economical means of acquiring a more accurate representation of the bar code signal (or a signal corresponding to any other indicia to be read) by selectively sampling the analog signal, or a processed analog signal at a rate which is well below the Nyquist rate. The sample points are not uniform and are chosen to represent key features related to the signal.

If an attempted decode fails, based upon the samples that have been obtained, mechanical, electrical or logical adaptations are made to the scanner in an attempt to provide an improved decode on the next scan. To that end, the decoder analyses the samples to provide information on the extent to which the samples appear to be represent data corresponding to the indicia, and the extent to which the samples are spurious (for example because they represent noise). The information thus determined is used to provide feed-back to adapt the scanner to the current scanning environment, thereby providing improved performance on the next subsequent scan.

There are many adaptations that could be made, on the basis of the information that has been determined, for example adapting the signal processing of the analog electrical signal, or changing noise thresholds, frequency bandwidths, deconvolution filters, scanning speed, scanning pattern, and laser focusing. Any one or any combination of these may be adaptively altered in the method of the present invention.

A timing signal is preferably produced which synchronizes and/or provides timing information on the samples that have been taken. In the preferred embodiment, the timing signal is a square wave which changes state whenever a sample has been taken. The timing signal provides further information which is used by the decoder, in association with the values of the samples themselves, thereby enabling the decoder to attempt to decode the indicia.

In the preferred embodiment, a sample is taken of an analog electrical signal which is representative of light which has been reflected from the indicia at positions which correspond to peaks in the derivative of the said signal. A minimum rejection level may be provided, and the detection logic arranged so that no sample is taken if the corresponding peak is smaller than the minimum level. The value of that minimum level may be one of the adaptive parameters which may be altered according to the estimated amount of noise that has been round on analysis of previous samples.

The method of the present invention may be particularly useful in devices which make use of non-conventional optics, for example axicon or holographic optics. Such optics may increase the working range of a laser scanner significantly, as is described for example in U.S. Pat. No. 5,080,456. The profile produced by such non-conventional optics are multimodal and contain side lobes. These side lobes introduce additional "wiggles" or bumps on the analog signal. These additional "wiggles", if detected by a standard digitizer, will most probably result in an unrecoverable error in the bar code representation, thereby making the system less reliable. However, if such non-conventional optics are used in conjunction with the method of the present invention, a much more robust system can be created. Small wiggles introduced by the scanning beam profile may be ignored by the decoder, merely by properly selecting the larger features and ignoring the smaller ones.

The method of the present invention is also particularly useful in scanners that make use of enhancement filters to increase the depth of modulation, for example as described in U.S. Pat. No. 5,140,146. In such devices, the resulting enhanced analog signal normally exhibits "ringing". This ringing introduces additional "wiggles" in the analog signal, similar to those described above. However, if enhancement filters are used in conjunction with the method of the present invention, a much more robust system can be created. Small wiggles introduced by the enhancement filter can be ignored by the decoder by properly selecting the larger features and ignoring the smaller ones. This also reduces the trade-off that has to be made between reading high density bar code symbols with a very low depth of modulation, and low quality bar code symbols that might include printing noise (for example dot matrix bar codes).

BRIEF DESCRIPTION OF THE DRAWINGS

The invention may be carried into practice in a number of ways and one specific embodiment will be described, by way of example, with reference to the accompanying drawings, in which.

DETAILED DESCRIPTION OF THE PREFERRED EMBODIMENT

Figure 1:
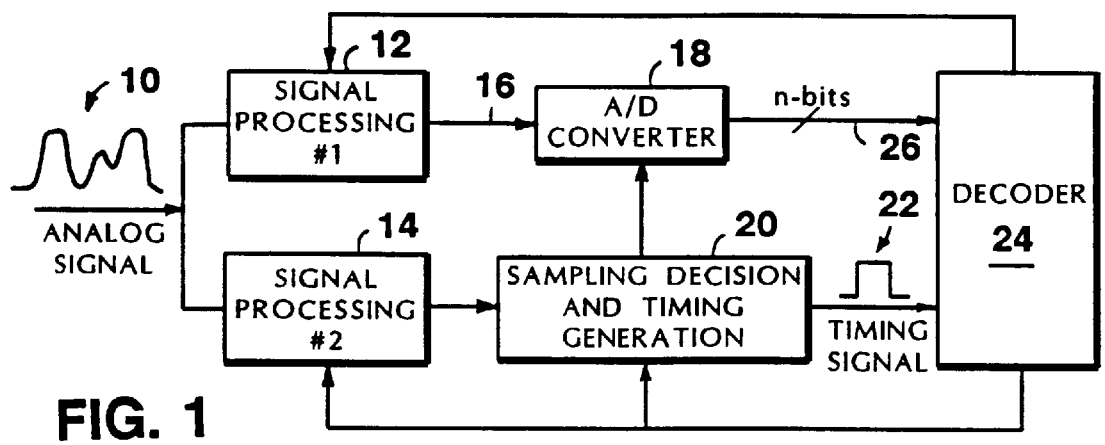
FIG. 1 is a block diagram of an exemplary apparatus for use with a method according to the present invention.

Turning first to FIG. 1, there is shown a block diagram of an apparatus which embodies the preferred method of the present invention.

The analog signal 10 to be decoded, which may be distorted and/or which may have noise associated with it, is applied in parallel to first and second signal processing blocks 12, 14. Although two separate signal processing blocks are shown, some or all of the signal processing functions may be shared. For example, a derivative function could be shared between the two blocks. The first signal processing block 12 operates upon the signal in any desired manner, to derive a waveform which is output along a line 16 and applied to an A/D converter 18. The output waveform need not be a simple function of the analog signal 10. For example, the output waveform may be derived from the analog signal using a combination of sample and hold circuits, derivatives, threshold functions and subtractors. Nonlinear circuits such as clamping circuits may also be utilized.

The output waveform is selectively sampled by the A/D converter 18 according to signals provided by a sampling decision and timing generation block 20.

The second signal processing block 14 receives the analog signal 10, and performs the processing that is required by the sampling decision and timing generation block 20. The block 20 decides when a selective sample should occur and generates the appropriate timing signal 22, which is passed to a decoder 24. The appropriate signal is also passed to the A/D converter 18.

Figure 2:
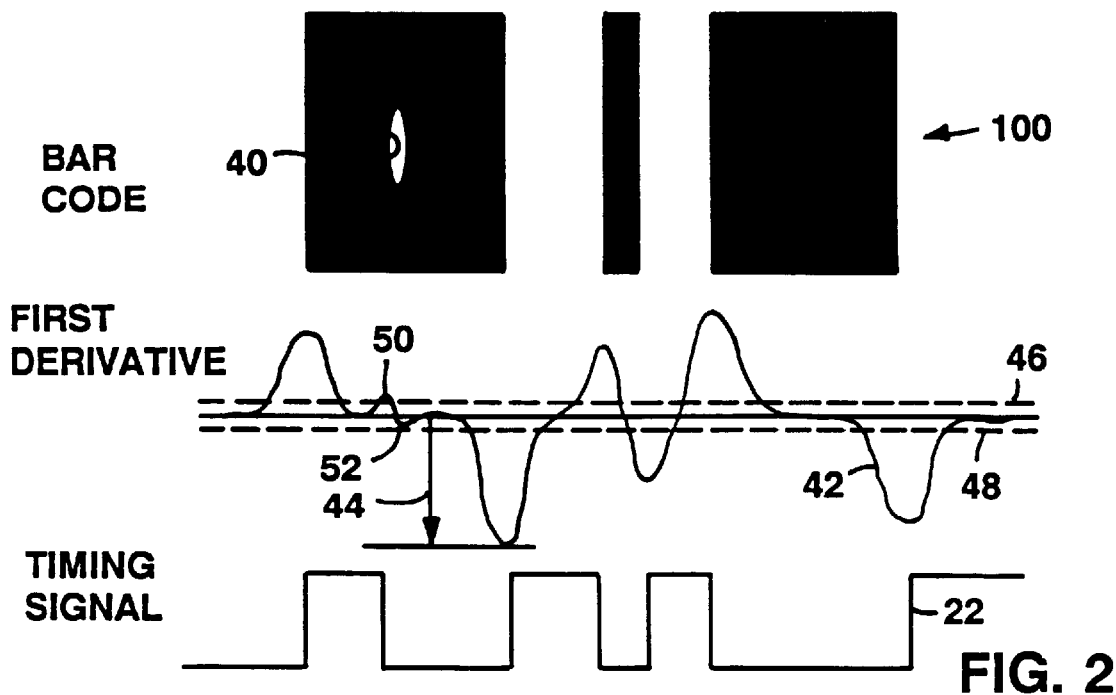
FIG. 2 shows an exemplary method according to the present invention, for decoding a bar code signal.

The detailed logic within the block 20, which determines exactly when the output waveform along the line 16 is to be sampled, may be chosen according to the particular application. The decision criteria will, however, frequently involve a selected noise threshold, with features in the signal below that threshold being ignored. A specific example is shown in FIG. 2, which will be described below.

The main purpose of the timing signal 22 is to synchronize the transfer of the selective samples to the decoder. This is necessary due to non-uniform sampling of the waveform. The timing signal provides crucial timing information such as the time between the selective samples.

The timing signal need not be a single signal but could, in some circumstances, be a multiple signal on a plurality of digital lines. Alternatively, the timing information could be multiplexed on a single line. There may be situations, for example, where it is convenient to have two digital lines, one for positive peaks which have been detected in the output signal on the line 16, and one for negative peaks.

Although synchronization is the timing signal's main function, the timing signal may in itself contain additional information about the waveform that the A/D samples do not convey. Additional pulses can, for example, selectively send additional timing information about the original waveform. The timing signal may, for example, not only synchronize the data transfer but may also contain edge rise time information represented as a pulse width. Such a concept is disclosed in a patent application filed concurrently herewith entitled "Optical Scanners and Signal Processors Therefor", inventors David Goren, Stephen Shellhammer, Harry Kuchenbrod, Donna Pandolfo, Gary Serbin, Guy Cipriani, and Edward Barkin, assigned to the same assignee as the present invention. The information could also be used without the A/D converter for a very low cost implementation: see for example our copending U.S. patent application number.

The A/D converter 18 receives the output signal along the line 16, and selectively samples it according to instructions received from the sampling decision and timing generation block 20. The sampled n-bit output is passed along the line 26 to the decoder 24.

The A/D converter 18 may include a sample and hold circuit if required. Due to the slower date rate compared with sampling the analog signal at the Nyquist rate, a relatively slow and relatively inexpensive A/D converter can be used. The number of bits required depends on the accuracy of the feature being measured, but normally 4 to 8 bits will be sufficient. The A/D converter may, if necessary, be bipolar to contain signed data. For example, if the peaks of the first derivative of the analog signal 10 are above a reference voltage, the peaks can be positive. If the peaks are below the reference voltage, the values may be negative.

Figure 3:
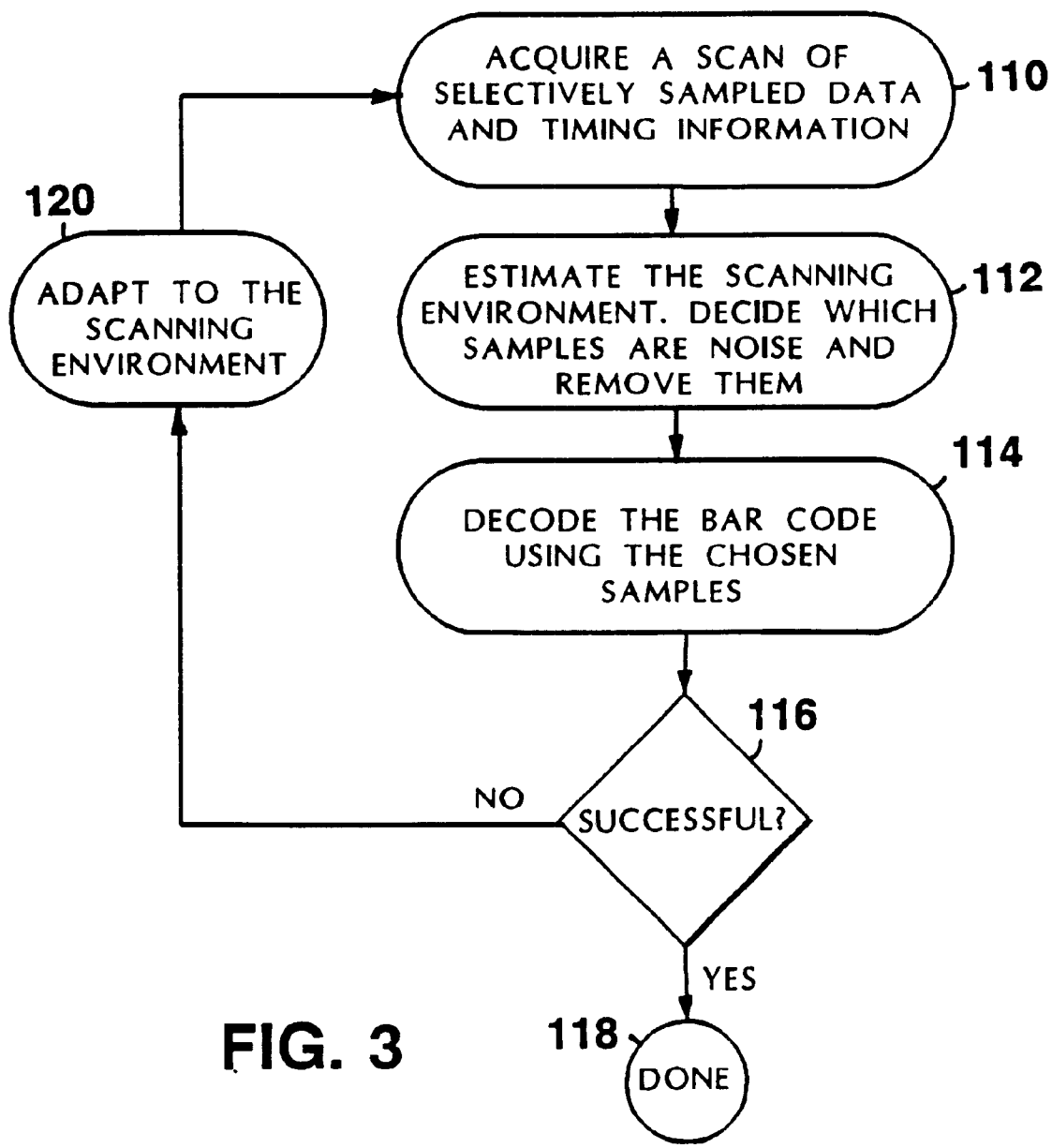
FIG. 3 is a flow chart of the operation of the decoder shown in FIG. 1.

A flow chart of the operation of the decoder 24 is shown in FIG. 3. The decoder first acquires and stores the selective samples and the timing information. This information will normally contain both the features of the waveform that identify the bar code or other indicia (for example the bar code edges) as well as unwanted noise. The decoder then uses an appropriate algorithm (the details of which are well within the scope of a skilled man in the art) to attempt to identify which samples are noise and which samples represent the indicia to be decoded. Typically, the algorithm will use a combination of trial and error and data analysis techniques, such as statistical classification. This analysis will also lead to an estimate of the coding environment, for example the noise level and the distortion levels. An attempt is then made to decode the indicia using only those features which have been determined by the algorithm to represent the indicia.

Added decode security may be required, according to the algorithms estimate of the difficulty of the decode environment. For example, the decoder may require additional redundancy before signalling a successful decode if it determines that a high noise level is present If the decode is unsuccessful, a feed-back signal or series of signals is sent from the decoder to the second signal processing block 14 and the sample decision and timing generation block 20. These react to the signals by adapting the scanner to the scanning environment. Another scan of the indicia to be decoded may then be taken, this being processed by the adapted electronics and/or digital logic for a second attempt to achieve a satisfactory decode.

The adaptations of the scanner may include, inter alia, changing noise thresholds, signal filtering, frequency bandwidths, enhancement or deconvolution filters, and other electronic and/or digital logic. The mechanical/optical features of the scanner may also be adaptive, for example the system may automatically change the intensity of the laser beam used for scanning, the laser focusing, scanning speed and pattern, or other variables.

Returning to FIG. 3, it will be seen that at step 110 the system acquires a scan of selectively sampled data and timing information. The decoder then attempts to estimate the scanning environment, and to deal as far as possible with noise and with systematic inaccuracies in the data. This is carried out at step 112. At step 114, the decoder attempts to decode the bar code (or other indicia) using only those samples which have been determined to represent real data. At step 116, a test is made to see whether the decode has been successful. If it has, the algorithm finishes at step 118. If the decode was unsuccessful, the scanner is adapted to the scanning environment at step 120, and the process is repeated using a new scan.

A simple embodiment of the present invention is illustrated in FIG. 2. As illustrated, the bar code symbol 100 to be decoded includes a small flaw 40.

The symbol 100 is scanned in the usual way, and the first derivative 42 of the raw analog signal is determined. In this embodiment, it is the peak values of the first derivative signal which are used as the selective sample points. These peaks may be positive or negative, and typical negative peak being illustrated in the drawing by the arrow 44.

The sample decision and timing generation logic is arranged to output a timing signal 22 which changes state at each of the selected sample points.

The decision logic within the block 20 (FIG. 1) is arranged to accept a sample only when the first derivative is larger than a positive minimum level 46 or is lower than a negative minimum level 48. Accordingly, the small peak 50, associated with the flaw 40 corresponds to an accepted sample point, because it lies outside the lines 46, 48, whereas the even smaller peak 52 is not accepted.

The peaks in the first derivative signal 42 represent inflection points of the original raw data signal, and are defined as bar code edge locations in may prior art digitizers. The decoder 24 reads in all the peak values, some of which of course represent real edges and others which represent noise. The decoder then decides which edges are real, for example by trial and error or by histogram analysis. Once the real edges have been chosen, the bar code signal can be decoded by standard methods. If the decode is unsuccessful, it is clear that the edges have not been chosen correctly, and the adaptive algorithm shown in FIG. 3 comes into play.

From the peaks of the first derivative and the bar code decoded or partially decoded, information about the decoding environment can be determined. For example, a large number of false edges can indicate a noisy environment. The various heights of the peaks of the real edges can also be used to estimate the ratio of the scanning spot size to the bar sizes being scanned. This information about the scanning environment is then used to adapt the mechanical, optical, electronic or digital features of the scanner prior to a further scar being taken and another attempt being made to decode the bar code symbol. In an alterative version of the method, selective sampling may be performed on more than one features simultaneously. This could be done either with multiple A/D convertors, or alternatively by using a single A/D convertor and multiplexinq the output.

It is of course not essential for the preferred method to be embodied within the specific architecture shown in FIG. 1. There are many alternatives. For example, the first and second signal processing blocks 12, 14 could be merged into a single unit, or even omitted altogether for suitable analog input signals 10.

As previously mentioned, the method that has been described above may find particular application in laser scanners of the type in which the received beam profile is multimodal, and contains side lobes which are an artifact of the imaging process. The examples scanners using non-conventional optics such as axicon or holographic optics, and scanners using enhancement filters to increase depth of modulation.

Although the invention has been specifically described in connection with the decoding of indicia, particularly bar code symbols, the technique could be applied to many different types of signals and applications. More generally, the method the present invention may be applied to pattern recognition, either in detected images or in detected sounds. The method could be used, for example, in voice recognition techniques and/or speech recognition.

While this invention has been described with reference to a specific embodiment, the above description is not meant to be construed in a limiting sense. Various modifications of the disclosed embodiments, as well as other embodiments of the invention, will be apparent to persons skilled in the art upon reference to this description. It is accordingly intended that the appended claims will cover any and all such modifications and embodiments as fall within the scope and spirit of the invention.

What is claimed is:

1. A bar code reader comprising a light source for producing a light beam for illuminating a target or portion thereof;

a scanner for scanning at least one of said beam and said field of view;

an optical arrangement utilizing non-conventional optics for focusing said light beam on the target to be scanned;

a sensor for sensing light reflected from a bar code symbol on the target and for producing an analog scan signal representative thereof; and a digitizer for converting the analog scan signal into a digitized signal using multiple threshold processing at different detection threshold levels.

2. A reader as defined in claim 1, further comprising:

means for detecting positive and negative edges in the analog scan signal and for developing timing signals representative thereof.

3. The bar code reader of claim 1 wherein the non-conventional optics include an axicon.

4. The bar code reader of claim 1 wherein the non-conventional optics include holographic optics.

5. The bar code reader of claim 1 wherein the received beam profile is multimodal.

6. The bar code reader of claim 1 wherein the received beam profile contains side lobes.

7. The bar code reader of claim 1 wherein the optics introduce bumps into the analog signal.

8. The bar code reader of claim 6 wherein the side lobes introduce bumps into the analog signal.

9. The bar code reader of claim 1 further comprising an enhancement filter to increase the depth of modulation.

10. The bar code reader of claim 1 wherein the non-conventional optics include at least one of an axicon and holographic optics, and the received beam profile is multimodal and contains side lobes that introduce bumps into the analog signal.

11. The bar code reader of claim 10 further comprising an enhancement filter to increase the depth of modulation.

12. The bar code reader of claim 1 wherein the digitizer uses first derivative information in the decoding process.

* * * * *

UNITED STATES PATENT AND TRADEMARK OFFICE
CERTIFICATE OF CORRECTION

PATENT NO. : 6,547,142 B1
DATED : April 15, 2003
INVENTOR(S) : David Goren, Edward Barkan and Raj Bridgelall It is certified that error appears in the above-identified patent and that said Letters Patent is hereby corrected as shown below:

<u>Title page,</u>
Item [57], ABSTRACT,
Line 2, delete "comprises".

<u>Column 1,</u>
Line 9, "6,170,709" should be -- 6,170,749 --.
Line 30, "from" should be -- form --.

<u>Column 5,</u>
Line 54, after "present", insert a period.

<u>Column 6,</u>
Line 38, delete "may".
Line 56, "scar" should be -- scan --.

<u>Column 7,</u>
Line 5, after "examples", insert -- are --.
Line 13, after "method", insert -- of --.

<u>Column 8,</u>
Line 16, "claim 1" should be -- claim 5 --.

Signed and Sealed this

Twenty-third Day of December, 2003

JAMES E. ROGAN
*Director of the United States Patent and Trademark Office*